(12) United States Patent
Yerramalli et al.

(10) Patent No.: US 10,531,473 B2
(45) Date of Patent: Jan. 7, 2020

(54) BLIND DETECTION AND REPORTING OF INTERFERENCE IN UNLICENSED SPECTRUM

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Jing Lei, San Diego, CA (US); Sridhar Ramanujam, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/274,632

(22) Filed: Sep. 23, 2016

(65) Prior Publication Data

US 2017/0094672 A1 Mar. 30, 2017

Related U.S. Application Data

(60) Provisional application No. 62/233,212, filed on Sep. 25, 2015.

(51) Int. Cl.
*H04W 72/08* (2009.01)
*H04W 24/10* (2009.01)
(Continued)

(52) U.S. Cl.
CPC .......... *H04W 72/082* (2013.01); *H04L 43/16* (2013.01); *H04W 24/10* (2013.01); *H04W 28/0236* (2013.01)

(58) Field of Classification Search
None
See application file for complete search history.

(56) References Cited

U.S. PATENT DOCUMENTS

2011/0085612 A1\* 4/2011 Muraoka ............... H04W 16/14
375/260
2012/0183030 A1 7/2012 Turunen et al.
(Continued)

FOREIGN PATENT DOCUMENTS

CN 103763290 A 4/2014
CN 104335661 A 2/2015
(Continued)

OTHER PUBLICATIONS

International Search Report and Written Opinion issued in International Patent Application No. PCT/US2016/053600 dated Apr. 3, 2017 (12 pages).

*Primary Examiner* — Christopher M Crutchfield
*Assistant Examiner* — Alan L Lindenbaum
(74) *Attorney, Agent, or Firm* — Arent Fox, LLP

(57) ABSTRACT

The disclosure provides for detecting interference in wireless communications. A wireless devices may receive an interfering signal on a portion of unlicensed spectrum. The wireless device may perform cyclic autocorrelation on the interfering signal to determine one or both of a cyclic prefix length and a symbol period. The wireless device may determine a radio access technology of the interfering signal based on one or both of the cyclic prefix length and the symbol period. In an aspect, the wireless device may further transmit an interference report including information regarding the interfering signal including the cyclic prefix length, symbol period, identified radio access technology, or packet length.

30 Claims, 10 Drawing Sheets

(51) Int. Cl.
*H04L 12/26* (2006.01)
*H04W 28/02* (2009.01)

(56) References Cited

U.S. PATENT DOCUMENTS

| | | | |
|---|---|---|---|
| 2015/0057011 A1* | 2/2015 | Di Girolamo | H04W 74/0808 455/454 |
| 2015/0071370 A1* | 3/2015 | Wilhelmsson | H04L 1/0006 375/285 |
| 2015/0156650 A1* | 6/2015 | Li | H04W 72/085 455/67.11 |
| 2015/0208253 A1 | 7/2015 | Kim et al. | |
| 2015/0311923 A1* | 10/2015 | Valliappan | H04W 16/14 370/338 |

FOREIGN PATENT DOCUMENTS

| | | |
|---|---|---|
| WO | 2013075484 A1 | 5/2013 |
| WO | WO-2013143053 A1 | 10/2013 |

* cited by examiner

BLIND DETECTION AND REPORTING OF INTERFERENCE IN UNLICENSED SPECTRUM

CLAIM OF PRIORITY UNDER 35 U.S.C. § 119

The present Application for Patent claims priority to Provisional Application No. 62/233,212 entitled "BLIND DETECTION AND REPORTING OF INTERFERENCE IN UNLICENSED SPECTRUM" filed Sep. 25, 2015, which is assigned to the assignee hereof and hereby expressly incorporated by reference herein for all purposes.

BACKGROUND

The described aspects relate generally to wireless communication systems. More particularly, the described aspects relate to techniques for interference detection in unlicensed spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level.

An example telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Operation of wireless devices in certain portions of a shared or unlicensed spectrum may experience interference from another radio access technology (RAT) using the spectrum. For example, both LTE and Wi-Fi may operate in an unlicensed 5 GHz band. Over-the-air interference detection is employed in some wireless communication networks in an attempt to mitigate such interference. For example, a device may periodically monitor (e.g., sniff) for energy in the RF band used by the device. Upon detection of any kind of energy, the device may back-off, e.g., not transmit on, the RF band for a period of time. Energy detection, however, may not be able to identify the interfering RAT, limiting the available techniques to mitigate interference. Another approach is to detect a specific characteristic of an interfering signal based on the RAT (e.g. a Wi-Fi pre-amble or LTE reference signal). This approach, however, may require prior knowledge of the interfering signal or specific timing.

Therefore, there is a desire for improvements in techniques for detecting and reporting interference, especially in unlicensed spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure provides for detecting interference in wireless communications. A wireless device may receive an interfering signal on a portion of unlicensed spectrum. The wireless device may perform cyclic autocorrelation on the interfering signal to determine one or both of a cyclic prefix length and a symbol period. The wireless device may determine a radio access technology of the interfering signal based on one or both of the cyclic prefix length and the symbol period. In an aspect, the wireless device may further transmit an interference report including information regarding the interfering signal including the cyclic prefix length, symbol period, identified radio access technology, or packet length.

In an aspect, the disclosure provides a method of detecting interference in wireless communications. The method may include receiving an interfering signal on a portion of unlicensed spectrum. The method may also include performing cyclic autocorrelation on the interfering signal to determine one or both of a cyclic prefix length and a symbol period. The method may further include determining a radio access technology of the interfering signal based on one or both of the cyclic prefix length and the symbol period.

In another aspect, the disclosure provides an apparatus for detecting interference in wireless communications. The apparatus may include a transceiver configured to receive an interfering signal on a portion of unlicensed spectrum. The apparatus may also include a memory and a processor communicatively coupled to the transceiver and the memory. The processor and the memory may be configured to perform cyclic autocorrelation on the interfering signal to determine one or both of a cyclic prefix length and a symbol period. The processor and the memory may be configured to determine a radio access technology of the interfering signal based on one or both of the cyclic prefix length and the symbol period.

In another aspect, the disclosure provides another apparatus for detecting interference in wireless communications. The apparatus may include means for receiving an interfering signal on a portion of unlicensed spectrum. The apparatus may include means for performing cyclic autocorrelation on the interfering signal to determine one or both of a cyclic prefix length and a symbol period. The apparatus may include means for determining a radio access technology of the interfering signal based on one or both of the cyclic prefix length and the symbol period.

In another aspect, the disclosure provides a computer-readable medium storing computer executable code for detecting interference in wireless communications. The computer-readable medium may include code to receive an interfering signal on a portion of unlicensed spectrum. The computer-readable medium may include code to perform cyclic autocorrelation on the interfering signal to determine one or both of a cyclic prefix length and a symbol period. The computer-readable medium may include code to determine a radio access technology of the interfering signal based on one or both of the cyclic prefix length and the symbol period To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
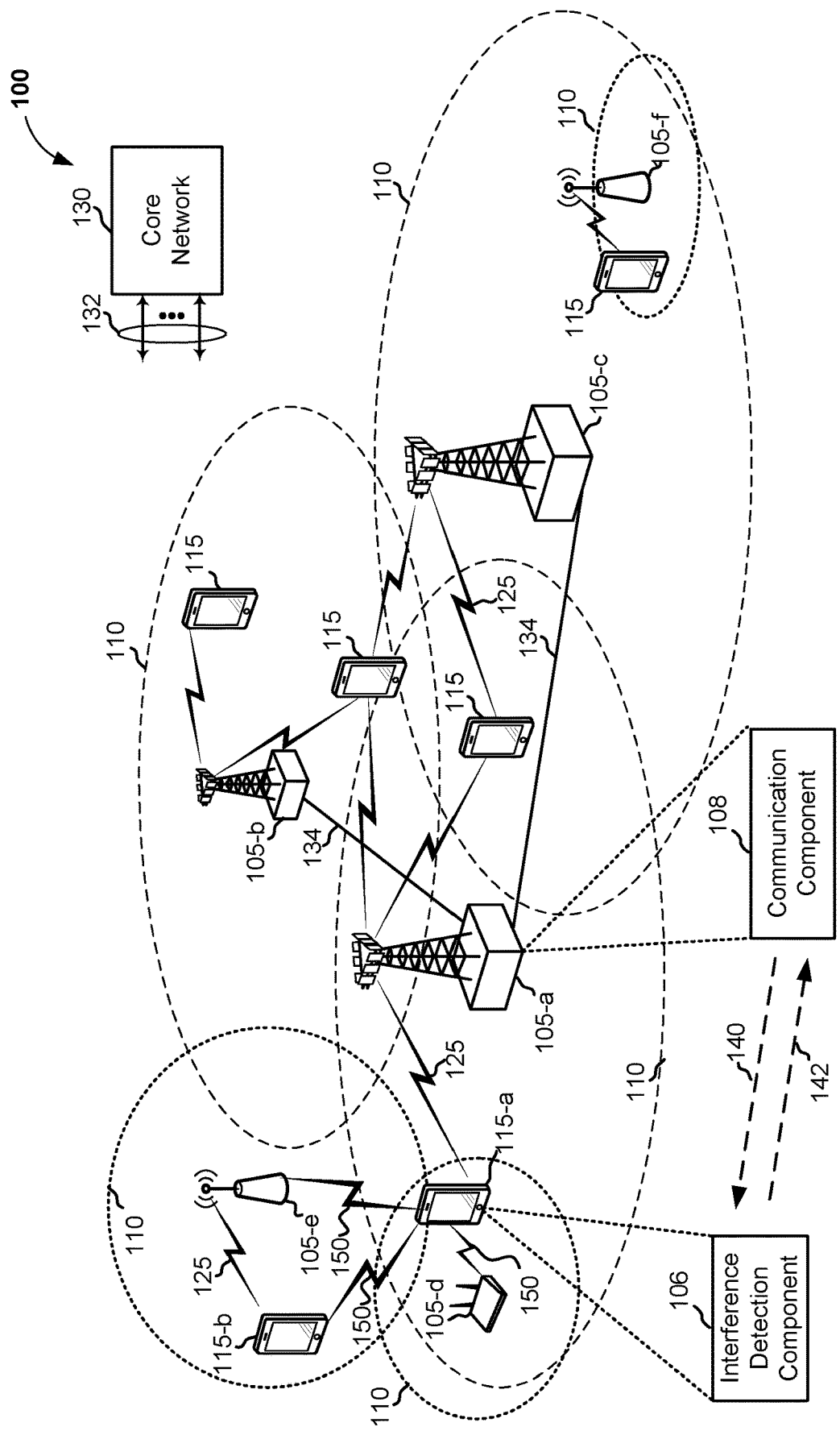
FIG. 1 is a block diagram illustrating a wireless communication system in which interference detection and reporting may be implemented in accordance with the present aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, the term "component" as used herein may be one of the parts that make up a system, may be hardware or software or some combination thereof, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents various aspects for managing interference detection and reporting in unlicensed spectrum, for example, between a UE and an eNB. A UE may detect an interfering signal. Using cyclostationarity, the UE may identify a cyclic prefix length and/or symbol period of the interfering signal. The UE may then determine a radio access technology (RAT) of the interfering signal. The UE may report information regarding the interfering signal to the eNB. For example, the UE may provide the cyclic prefix length, the symbol period, the channels on which the interfering signal was simultaneously detected, and/or a duration of a packet on the interfering signal. In an aspect, the interference reporting may be requested by the eNB, periodically reported, and/or triggered by events detected at the UE. The interference detection and reporting may also be combined with energy detection to provide a received signal strength indicator (RSSI) corresponding to the interfering signal.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, also referred to herein as network nodes, a number of user equipment (UEs) 115, and a core network 130. Access points 105 may include a communications component 108 configured to communicate one or more downlink signals 140 including configuration messages and/or UE data to UEs, including UE 115-a. In an aspect, a UE (e.g. UE 115-a) may not be in communication with one or more of the access points 105. For example, some of the access points 105 (e.g. access points 105-d and 105-e) may use different radio access technologies. Accordingly, the UE 115-a may receive an interfering signal 150 from such access points. Further, the UE 115-a may receive an interfering signal 150 from another UE (e.g. UE 115-b), which may be communicating with another access point using a different RAT. In an aspect, as used herein, the term "interfering signal" may refer to any signal received at a device that is not intended for the device. For example, an interfering signal may be a signal using a different RAT than the device. In an aspect, it may be useful for the UE 115-a and/or an access point 105 to identify the RAT of the interfering signals 150. Correspondingly, one or more of UEs, such as UE 115-a, may include an interference detection component 106 configured to receive an interfering signal on a portion of unlicensed spectrum, perform cyclic autocorrelation on the interfering signal to determine one or both of a cyclic prefix length and a symbol period, and determine a radio access technology of the interfering signal based on one or both of the cyclic prefix length and the symbol period.

In an aspect, a UE 115 may be in a position to detect interfering signals 150 that are unknown to an access point 105. For example, the UE 115-a may be within the coverage areas 110 of the access points 105-d and 105-e and receive the interfering signals 150 whereas the access point 105-a may not receive the interfering signals 150. In an aspect, the access points 105-d and 105-e may be considered hidden nodes to the access point 105-a.

In an aspect, for example, the interference detection component 106 may be configured to generate an interference report signal 142 including information (e.g., a cyclic prefix length and/or symbol period) associated with an interfering signal 150. The communications component 108 may receive the interference report signal 142 and manage communications based on the interference report signal 142. For example, the communications component 108 may attempt to mitigate interference to hidden nodes.

In an aspect, the communications component 108 of the access point 105-a may further include some or all of the structure and functionality described herein regarding the interference detection component 106. For example, the communications component 108 may also receive an interfering signal on a portion of unlicensed spectrum, perform cyclic autocorrelation on the interfering signal to determine one or both of a cyclic prefix length and a symbol period, and determine a radio access technology of the interfering signal based on one or both of the cyclic prefix length and the symbol period. In an aspect, the interference detection component 106 and the communications component 108 may communicate to cooperatively perform the functions described herein in a distributed manner.

Access points 105 may communicate control information and/or UE data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

For convenience, the use, operation, extension, and/or adaptation of LTE and/or LTE Advanced for applications in an unlicensed radio frequency (RF) band may be referred to herein as "LTE/LTE Advanced in unlicensed spectrum," "adapting LTE/LTE Advanced in unlicensed spectrum," "extending LTE/LTE Advanced to unlicensed spectrum," and "LTE/LTE Advanced communications over unlicensed spectrum" etc. Moreover, a network or device that provides, adapts, or extends LTE/LTE Advanced in unlicensed spectrum may refer to a network or device that is configured to operate in a contention-based radio frequency band or spectrum.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL) or license assisted access (LAA)). In either case, carrier aggregation may be employed to manage the different component carriers, with one carrier serving as the Primary Cell (PCell) for the corresponding user equipment (UE) (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

Each of the different operating modes that may be employed by wireless communications system 100 may operate according to frequency division duplexing (FDD) or time division duplexing (TDD). In some examples, OFDMA communications signals may be used in the communications links 125 for LTE downlink transmissions, while single carrier frequency division multiple access (SC-FDMA) communications signals may be used in the communications links 125 for LTE uplink transmissions. Additional details regarding implementation of status reporting in a system such as the wireless communications system 100, as well as other features and functions related to communications in such systems, are provided below with reference to the following figures.

Figure 2:
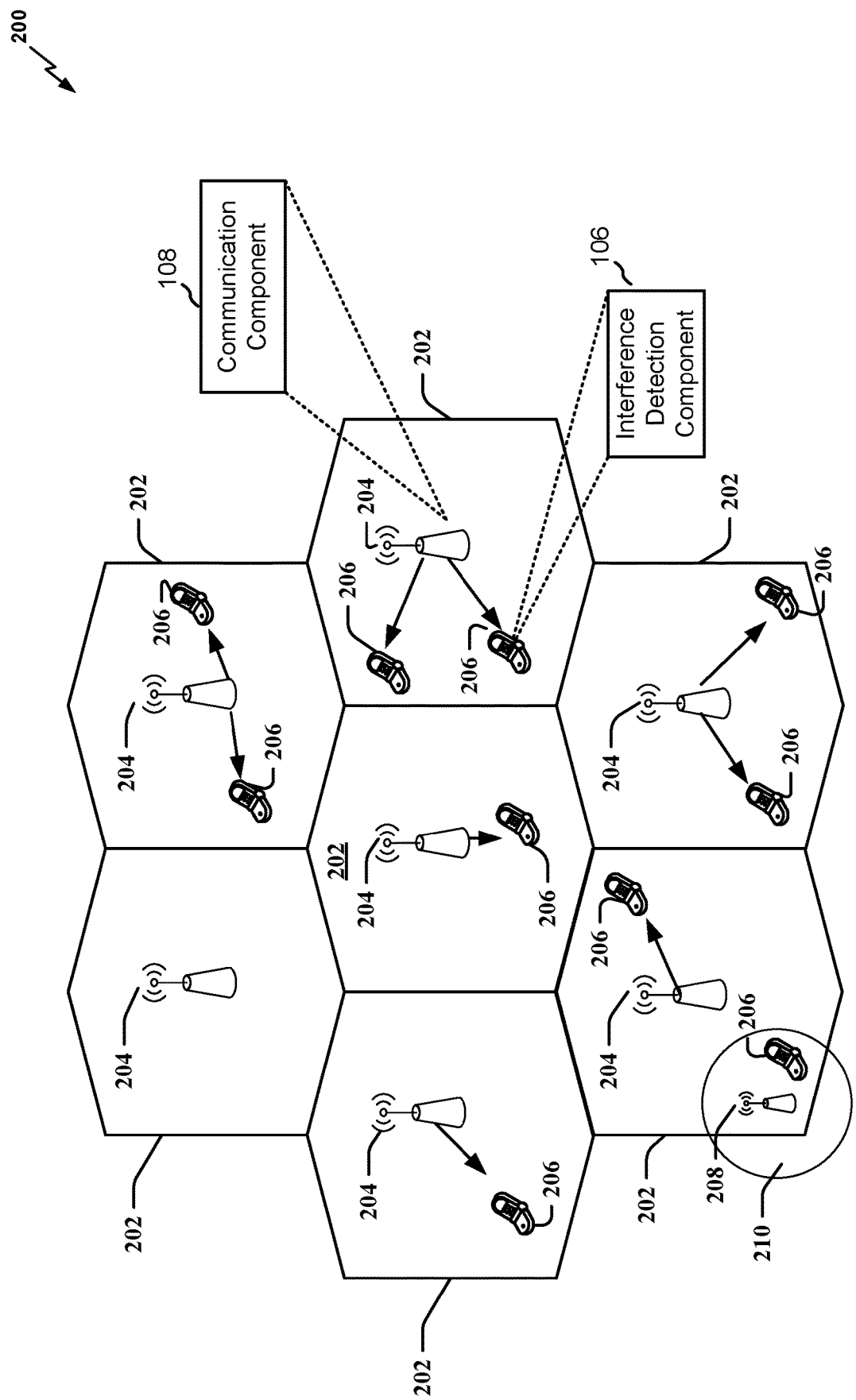
FIG. 2 is a diagram illustrating an example of an access network in which interference detection and reporting may be implemented in accordance with the present aspects.

FIG. 2 is a diagram illustrating an example of an access network 200 in an LTE network architecture, in which one or more UEs 206 may include interference detection component 106 to provide interference reports to one or more eNBs 208 in response to detecting an interfering signal, as described herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to a core network for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate, or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. As described in further detail below, the symbol period and cyclic prefix of an OFDM signal may be detected based on second order metrics. Similarly, the UL may use SC-FDMA in the form of a DFT-spread OFDM signal to compensate for high peak-to-average power ratio (PAPR).

In an aspect, various RATs operating in unlicensed spectrum may follow different OFDM numerologies. For example, an LTE transmission may use a 66.6 microsecond (μs) symbol period with a 4.7 μs cyclic prefix. As another example, a Wi-Fi transmission (e.g., 802.11a/g/n/ac) may use a 0.4 μs or 0.8 μs cyclic prefix and a 3.2 μs symbol period. As another example, a Wi-Fi transmission (e.g., 802.11ax) may use a 0.8 μs, 1.6 μs, or 3.2 μs cyclic prefix with an appropriately scaled symbol period. As another example, an eCC transmission may use a 0.95 μs normal cyclic prefix and a 3.3 μs extended cyclic prefix.

Figure 3:
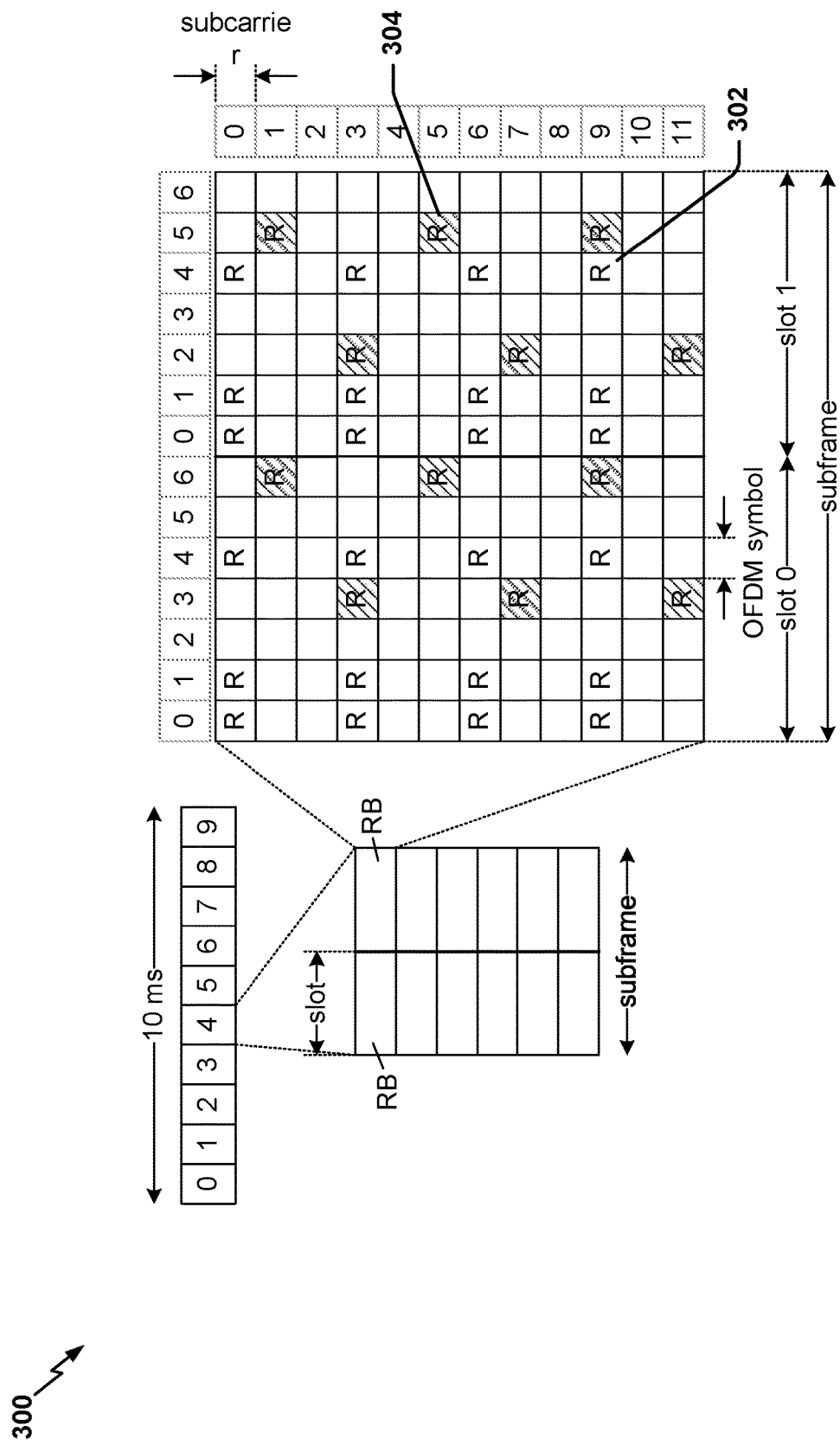
FIG. 3 is a diagram illustrating an example of a DL frame structure in LTE that may be used in conjunction with the present aspects.

FIG. 3 is a diagram 300 illustrating an example of a DL frame structure in LTE, which, in some examples, may be utilized by UEs and network nodes in the present disclosure for receiving downlink data packets and downlink grants. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding physical downlink shared channel (PDSCH) is mapped. The number of bits carried by each resource element depends on the modulation scheme. Thus, the more resource element blocks that a UE receives and the higher the modulation scheme, the higher the downlink data rate for the UE.

Figure 4:
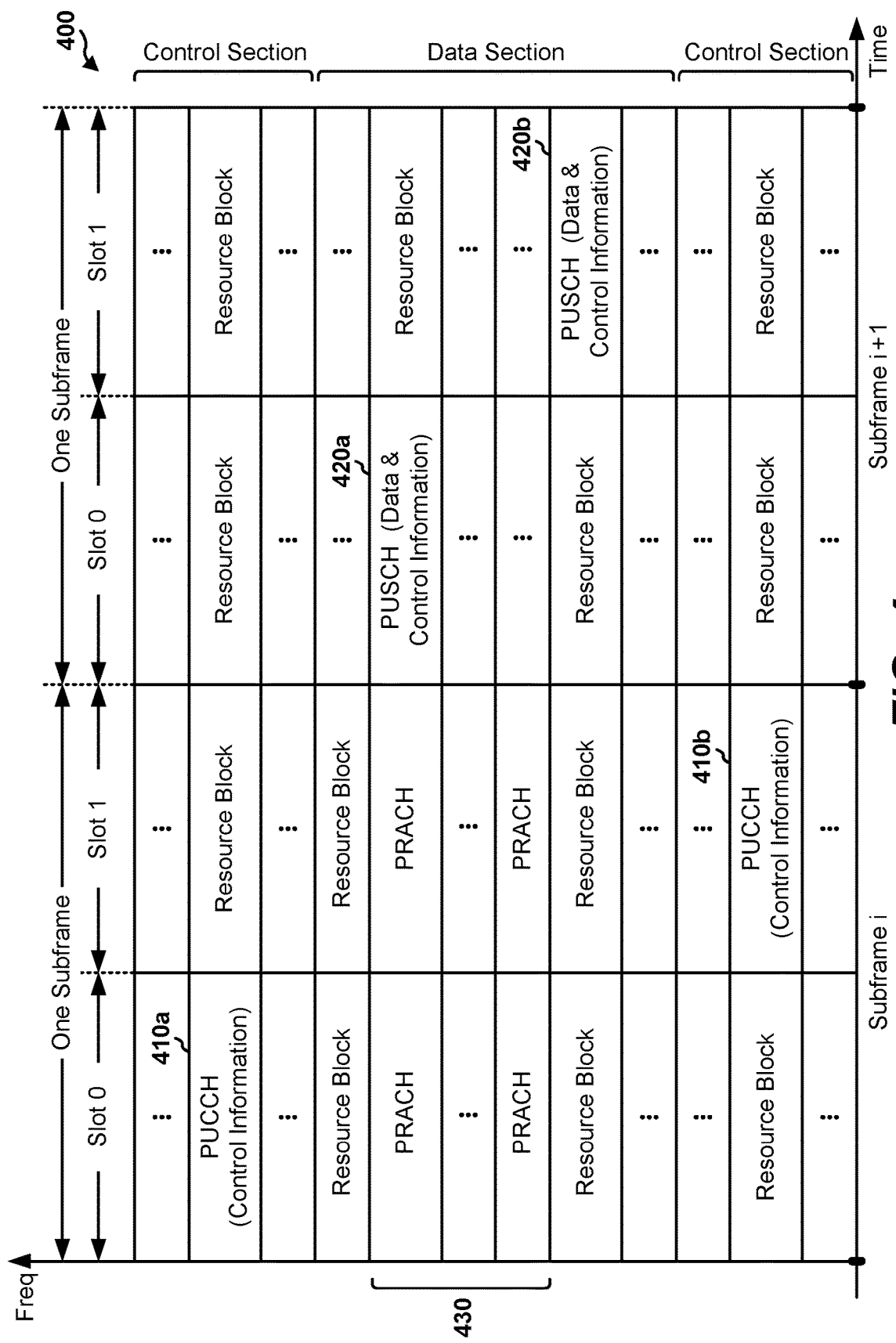
FIG. 4 is a diagram illustrating an example of an UL frame structure in LTE that may be used in conjunction with the present aspects.

FIG. 4 is a diagram 400 illustrating an example of an UL frame structure in LTE which, in some examples, may be utilized for transmitting a status report. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. In an aspect, the interference detection component 106 may transmit an interference report at the RRC layer as data on the PUSCH. An UL transmission may span both slots of a sub-frame and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH.

The PRACH attempt is carried in a single sub-frame (1 ms) or in a sequence of a few contiguous subframes and a UE can make only a single PRACH attempt per frame (10 ms).

Figure 5:
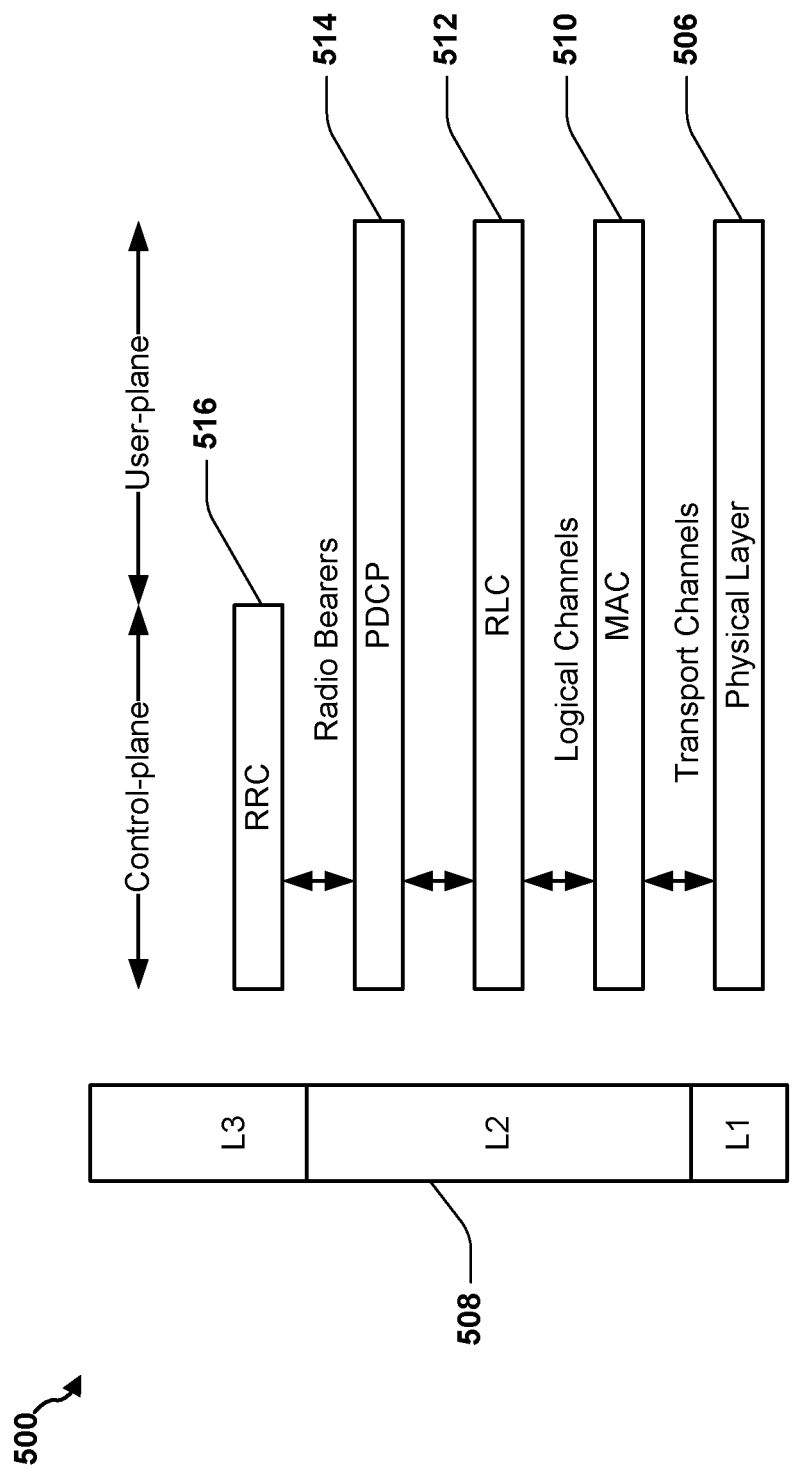
FIG. 5 is a diagram illustrating an example of a radio protocol architecture for the user and control planes that may be used in conjunction with the present aspects.

FIG. 5 is a diagram 500 illustrating an example of a radio protocol architecture for the user and control planes in LTE by which interference detection management may be implemented, as described herein. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated on the network side, a transport layer (e.g. TCP Layer) and an application layer that are terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). For example, the RLC sublayer 512 provides status reports from the UE to the eNB to identify missing data packets. The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

In an aspect, the interference detection component 106 may operate at the physical layer 506 to detect interfering signal and identify a RAT of the interfering signal. The interference detection component 106 may operate at the RRC sublayer 516 for reporting the interference to an access point 105.

Figure 6:
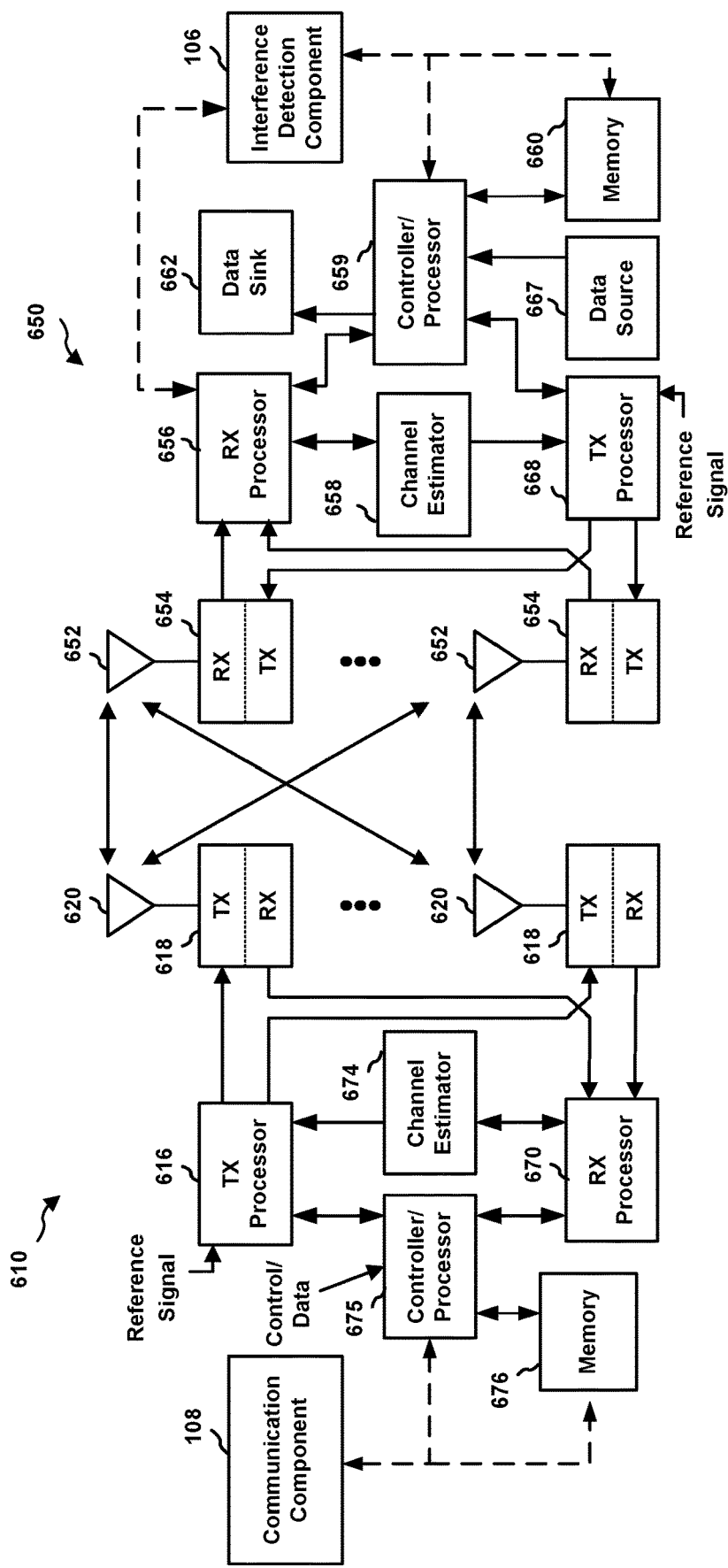
FIG. 6 is a diagram illustrating an example of an evolved Node B and user equipment in an access network in which interference detection and reporting may be implemented in accordance with the present aspects.

FIG. 6 is a block diagram of an eNB 610 in communication with a UE 650 in an access network in which UE 650 may include interference detection component 106 to provide interference reports to eNB 610 in response to detecting an interfering signal, as described herein. In the DL, upper layer packets from the core network are provided to a controller/processor 675. The controller/processor 675 implements the functionality of the L2 layer (e.g., RLC protocol). In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (e.g., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. In an aspect, the interference detection component 106 may operate on the information received from the receiver 654RX. In addition to the signal processing performed by the RX processor 656 to recover spatial streams destined for the UE 650, the interference detection component 106 may analyze the received signal to determine whether a radio access technology of an interfering signal can be detected. For example, the interference detection component 106 may perform cyclic auto-correlation on the received signal to determine patterns of an interfering signal. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. For example, the memory 660 may store program codes and data for implementing the interference detection component 106. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
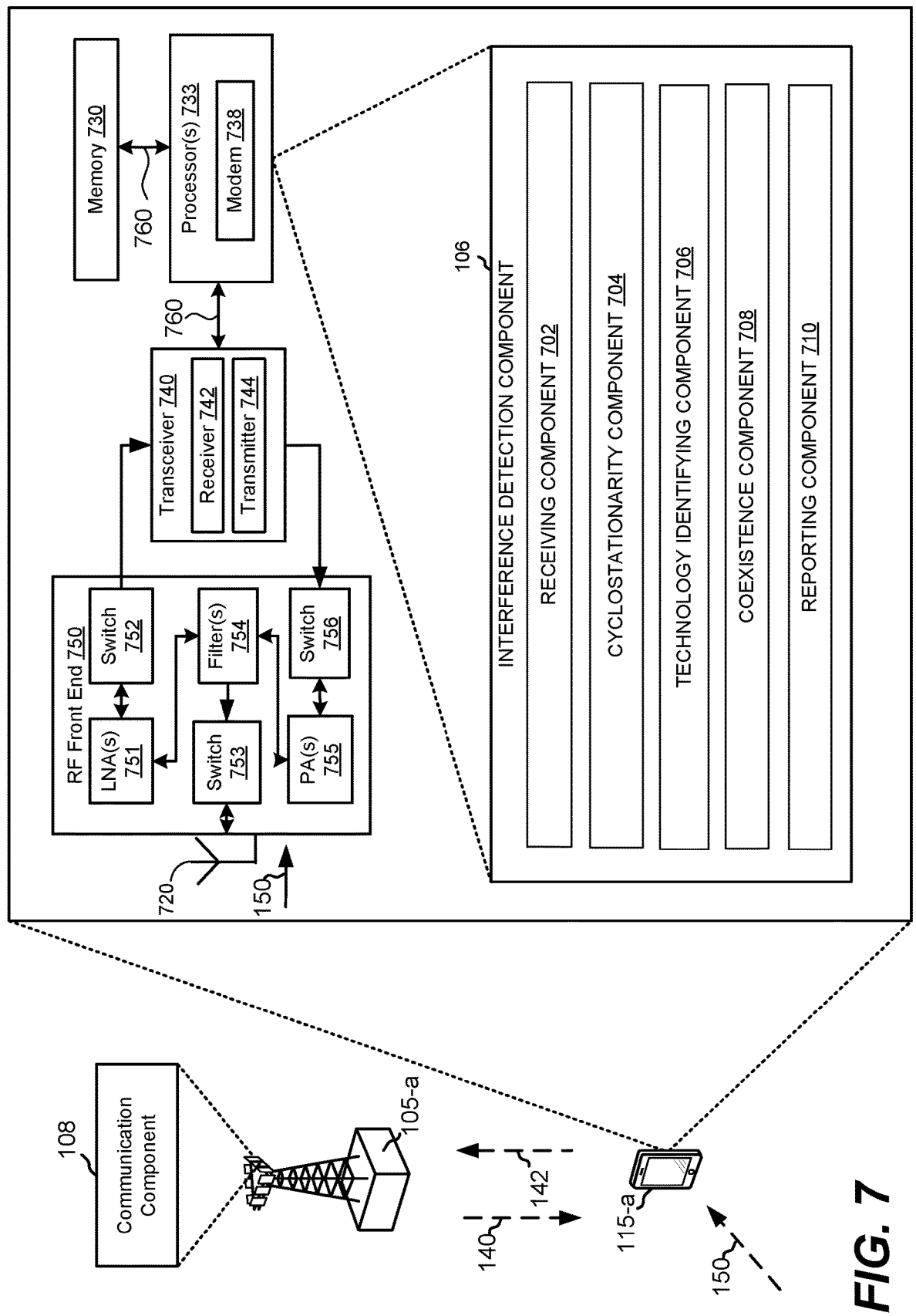
FIG. 7 is a diagram illustrating one or more components of a UE by which interference detection and reporting may be implemented in accordance with the present aspects.

Referring to FIG. 7, one or more components of UE 115-*a* of FIG. 1, by which interference detection and reporting may be implemented, are illustrated with respect to interference detection component 106. It should be noted that each of the one or more components of UE 115-*a* may be implemented as software, hardware, firmware, or any combination thereof. As noted above, UE 115-*a* generally operates interference detection component 106 to detect and report interfering signals 150 to an access point 105-*a*. In an aspect, the access point 105-*a* and/or the communications component 108 may include one or more of the sub-components of interference detection component 106 and/or perform any of the functions of interference detection component 106. Further, the access point 105-*a* may include a processor, memory, transceiver, RF front end and antenna similar to those described with respect to UE 115-*a*.

According to the present aspects, the UE 115-*a* may include one or more processors 733 that may operate in combination with the interference detection component 106 configured to detect and report one or more interfering signals 150 to an access point 105. For example, the interference detection component 106 may transmit an interference report. The interference detection component 106 may be communicatively coupled to a transceiver 740, which may include a receiver 742 for receiving and processing RF signals and a transmitter 744 for processing and transmitting RF signals. The interference detection component 106 may include a receiving component 702 for receiving an interfering signal on a portion of unlicensed spectrum, a cyclostationarity component 704 for performing autocorrelation on the interfering signal to determine one or both of a cyclic prefix length and a symbol period, a technology identifying component 706 for determining a RAT of the interfering signal based on one or both of the cyclic prefix length or the symbol period, a coexistence component 708 for adjusting an energy detection threshold based on the RAT of the interfering signal, and a reporting component 710 for transmitting an interference report to a base station. The processor 733 may be coupled to the transceiver 740 and a memory 730 via at least one bus 760.

The receiver 742 may include hardware, firmware, and/or software code executable by a processor for receiving data, the code comprising instructions and being stored in a memory (e.g., computer-readable medium). The receiver 742 may be, for example, a radio frequency (RF) receiver. In an aspect, the receiver 742 may receive signals transmitted by one or more of the access points 105. The receiver 742 may also receive one or more interfering signals 150 from an access point 105 or UE 115 to which the UE 115-*a* is not connected. In an aspect, an interfering signal 150 may be received separately when the downlink signal 140 is not being transmitted or received, or the interfering signal 150 may be combined with the downlink signal 140.

The transmitter 744 may include hardware, firmware, and/or software code executable by a processor for transmitting data, the code comprising instructions and being stored in a memory (e.g., computer-readable medium). The transmitter 744 may be, for example, a RF transmitter. The transmitter 744 may transmit an interference report generated by the interference detection component 106 to the access point 105-*a*. For example, in an LTE system, the transmitter 744 may transmit the interference report as data on a physical uplink shared channel (PUSCH).

In an aspect, the one or more processors 733 can include a modem 738 that uses one or more modem processors. The various functions related to interference detection component 106 may be included in modem 738 and/or processors 733 and, in an aspect, can be executed by a single processor, while in other aspects, different ones of the functions may be executed by a combination of two or more different processors. For example, in an aspect, the one or more processors 733 may include any one or any combination of a modem processor, or a baseband processor, or a digital signal processor, or a transmit processor, or a transceiver processor associated with transceiver 740. In particular, the one or more processors 733 may implement components included in the interference detection component 106.

The receiving component 702 may include hardware, firmware, and/or software code executable by a processor (e.g., processor(s) 733) for receiving an interfering signal 150 on a portion of unlicensed spectrum, the code comprising instructions and being stored in a memory (e.g., memory 730 or another computer-readable medium). For example, the receiving component 702 may include or control an antenna 720, RF front end 750, and/or receiver 742 to receive the interfering signal 150. In an aspect, the receiving component 702 may receive the interfering signal 150 at various times. For example, the receiving component 702 may be configured with measurement gaps where a downlink signal 140 from the access point 105-*a* is temporarily interrupted to allow the receiving component 702 to listen for an interfering signal 150 on a portion of unlicensed spectrum. The receiving component 702 may also receive the interfering signal 150 during a discontinuous reception (DRX) period with the access point 105-*a*. In another aspect, the receiving component 702 may use an antenna 720 or receive chain that is not being used for communication with the access point 105-*a* to receive the interfering signal 150. In another aspect, the receiving component 702 may receive a combined signal including the downlink signal 140 and the interfering signal 150. The receiving component 702 may use filtering, interference cancellation, or other techniques to process the combined signal.

The cyclostationarity component 704 may include hardware, firmware, and/or software code executable by a processor (e.g., processor(s) 733) for performing autocorrelation on the interfering signal to determine one or both of the cyclic prefix length and the symbol period of the interfering signal 150, the code comprising instructions and being stored in a memory (e.g., memory 730 or another computer-readable medium). The cyclostationarity component 704 may determine second order cyclostationarity properties of the interfering signal 150. For example, the cyclostationarity component 704 may perform cyclic autocorrelation on the interfering signal 150 to determine patterns of the interfering signal 150. For example, the cyclostationarity component 704 may delay the interfering signal 150 and correlate the delayed interfering signal with the original interfering signal. The cyclostationarity component 704 may also multiply the correlated signal by a sinusoidal frequency. The autocorrelation may exhibit higher correlation for delays of the symbol period and/or the cyclic prefix length. In an aspect, the cyclostationarity component 704 may test various hypotheses based on the symbol period and/or cyclic prefix length of known radio access technologies (e.g., Wi-Fi, another LTE system, or eCC). In an aspect, the cyclostationarity component 704 may further estimate a transmission opportunity (TXOP) duration (e.g. the length of a packet, frame, or sub-frame) of the interfering signal 150 using sequential detection. For example, the cyclostationarity component 704 may determine a duration of a TXOP of an interfering signal exhibiting a symbol period and/or cyclic prefix length by determining an approximate start and end of the interfering signal 150. In an aspect, the cyclostationarity component 704 may determine the cyclic prefix length and/or symbol period based on any portion of a data packet including multiple OFDM symbols or cylic prefixes. For example, the cyclostationarity component 704 may detect the cyclic prefix length and/or symbol period without receiving a preamble of a data packet. Moreover, in an aspect, the cyclostationarity component 704 may perform the cyclic autocorrelation without decoding the interfering signal 150. Accordingly, the interfering signal 150 may be identified without using a co-located receiver specific to the technology of the interfering signal 150. Additionally, the cyclostationarity component 704 may operate on an interfering signal 150 having a low signal-to-noise ratio (SNR) that may prevent decoding of the interfering signal.

The technology identifying component 706 may include hardware, firmware, and/or software code executable by a processor (e.g., processor(s) 733) for determining a RAT of the interfering signal based on one or both of the cyclic prefix length and the symbol period, the code comprising instructions and being stored in a memory (e.g., memory 730 or another computer-readable medium). For example, the technology identifying component 706 may compare the cyclic prefix length and/or symbol period to properties of known RATs (e.g., based on OFDM numerology for each RAT). The technology identifying component 706 may also identify a bandwidth or channels used by the interfering signal. For example, the technology identifying component 706 may determine a number of channels that concurrently receive an interfering signal 150 having similar cyclic prefix length and/or symbol period. The technology identifying component 706 may, depending on the radio access technology, determine whether the detected interference is caused by one or more of downlink, uplink, or sidelink transmissions. For example, the RAT may use a different cyclic prefix length, symbol period, or bandwidth based on the direction of the transmission. In another example, the technology identifying component 706 may identify the direction of the interfering signal based on a detected signal strength of the interfering signal. Additionally, interference may include different combinations of cyclic prefix and symbol periods that vary over time. The technology identifying component 706 may identify a pattern in the transmissions and determine the RAT based on the pattern. For example, if the cyclic prefix length or the symbol period changes for the same channel, the technology identifying component 706 may determine that the interfering signal is from a RAT that allows adaptation of the numerology.

The coexistence component 708 may include hardware, firmware, and/or software code executable by a processor (e.g., processor(s) 733) for adjusting an energy detection threshold based on the RAT of the interfering signal, the code comprising instructions and being stored in a memory (e.g., memory 730 or another computer-readable medium). In an aspect, the energy detection threshold may be a minimum energy level that may cause a wireless device to take an action to improve coexistence between the RAT of the wireless device and another RAT. For example, the wireless device may change channels to prevent interference to another RAT. In an aspect, the coexistence component 708 may adjust the energy detection threshold for different RATs. For example, the coexistence component 708 may reduce the energy detection threshold when the RAT of the interfering signal is Wi-Fi. The coexistence component 708 may further take an action to improve coexistence with the RAT of the interfering signal when the received energy exceeds the adjusted energy detection threshold. For example, the coexistence component 708 may change channels or reduce a transmission power. As another example, the coexistence component 708 may adjust a contention window size for channel access at either the UE 115-*a* or access point 105-*a* based on the outcome of detection of a radio access technology. For example, the contention window size may be based on the determined radio access technology. In an aspect, the contention window size on a first channel may be dependent on a radio access technology of an interfering signal detected on a different second channel. As another example, the coexistence component 708 may adjust a TXOP of the UE 115-*a* or access point 105-*a* based on a TXOP of the interfering signal. As another example, the coexistence component 708 may switch from a first window adaptation technique to a different second window adaptation technique based on an RSSI of the interfering signal and/or a duration of the TXOP of the interfering signal. In an aspect, the coexistence component 708 may communicate with the communications component 108 at an access point 105-a (e.g., an eNB) to perform any of the above functions. For example, the communications component 108 may implement the changes at the access point 105-a or transmit signaling to implement the changes at the UE 115-a.

The reporting component 710 may include hardware, firmware, and/or software code executable by a processor (e.g., processor(s) 733) for transmitting an interference report including one or both of the cyclic prefix length and the symbol period, the code comprising instructions and being stored in a memory (e.g., memory 730 or another computer-readable medium). In an aspect, the cyclic prefix length and the symbol period may include a combination or pattern of detected cyclic prefixes and symbol periods over a period of time. For example, for some RATs, the cyclic prefix length and/or symbol period may adapt over time. For example, a transmitting device may scale the numberology to use a longer or shorter symbol period in various situations. The interference report may include any detected changes in the cyclic prefix length and the symbol period of an interfering signal on a channel. In an aspect, the interference report may also or alternatively include an identified RAT of the interfering signal 150, a bandwidth of the interfering signal 150, channels on which the interfering signal 150 was concurrently detected, a TXOP of the interfering signal 150, a duration of a packet, or a frame structure. In an aspect, the reporting component 710 may be configured (e.g., by the access point 105-a) to transmit the interference report. For example, the access point 105-a may request an interference report for an indicated set of channels and provide a measurement gap to detect the interfering signal 150. As another example, the access point 105-a may configure the reporting component 710 to periodically transmit an interference report. In another aspect, the access point 105-a may configure the reporting component to transmit an interference report based on various events detected at the UE 115-a. For example, an example event may be detection of an interfering signal 150 from an identified RAT persistently (e.g., more than a threshold amount of time during a time period). Another example event may be determining that an interfering signal is from a RAT that has not been recently reported or is not stored in a list of neighboring RATs. Another example event may be determining that an interfering signal from a previously identified RAT has not been detected recently or for a defined time period. In an aspect, the reporting component 710 may also provide an energy measurement (e.g., received signal strength indicator (RSSI) for an interfering signal in an interference report. The energy measurement may be associated with the identified RAT. Further the interference report may indicate whether the interference is caused by one or more of uplink, downlink or sidelink transmissions. Accordingly, an access point 105 receiving one or more interference reports may be able to determine the presence or general location of another RAT network even if the interfering signal 150 is not received at the access point 105. In an aspect, the reporting component 710 may also provide the TXOP of the interfering signal 150 in an interference report.

RF front end 750 may be connected to one or more antennas 770 and an include one or more low-noise amplifiers (LNAs) 751, one or more switches 752, 753, one or more power amplifiers (PAs) 755, and one or more filters 754 for transmitting and receiving RF signals. In an aspect, components of RF front end 750 can connect with transceiver 740. Transceiver 740 may connect to one or more modems 738 and processor 733.

In an aspect, LNA 751 can amplify a received signal at a desired output level. In an aspect, each LNA 751 may have a specified minimum and maximum gain values. In an aspect, RF front end 750 may use one or more switches 752, 753 to select a particular LNA 751 and its specified gain value based on a desired gain value for a particular application.

Further, for example, one or more PA(s) 755 may be used by RF front end 750 to amplify a signal for an RF output at a desired output power level. In an aspect, each PA 755 may have a specified minimum and maximum gain values. In an aspect, RF front end 750 may use one or more switches 753, 756 to select a particular PA 755 and its specified gain value based on a desired gain value for a particular application.

Also, for example, one or more filters 754 can be used by RF front end 750 to filter a received signal to obtain an input RF signal. Similarly, in an aspect, for example, a respective filter 754 can be used to filter an output from a respective PA 755 to produce an output signal for transmission. In an aspect, each filter 754 can be connected to a specific LNA 751 and/or PA 755. In an aspect, RF front end 750 can use one or more switches 752, 753, 756 to select a transmit or receive path using a specified filter 754, LNA, 751, and/or PA 755, based on a configuration as specified by transceiver 740 and/or processor 103.

Transceiver 740 may be configured to transmit and receive wireless signals through antenna 770 via RF front end 750. In an aspect, transceiver may be tuned to operate at specified frequencies such that UE 115-a can communicate with, for example, access points 105. In an aspect, for example, modem 738 can configure transceiver 740 to operate at a specified frequency and power level based on the UE configuration of the UE 115-a and communication protocol used by modem 738.

In an aspect, modem 738 can be a multiband-multimode modem, which can process digital data and communicate with transceiver 740 such that the digital data is sent and received using transceiver 740. In an aspect, modem 738 can be multiband and be configured to support multiple frequency bands for a specific communications protocol. In an aspect, modem 738 can be multimode and be configured to support multiple operating networks and communications protocols. In an aspect, modem 738 can control one or more components of UE 115-a (e.g., RF front end 750, transceiver 740) to enable transmission and/or reception of signals from the network based on a specified modem configuration. In an aspect, the modem configuration can be based on the mode of the modem and the frequency band in use. In another aspect, the modem configuration can be based on UE configuration information associated with UE 115-a as provided by the network during cell selection and/or cell reselection.

UE 115-a may further include a memory 730, such as for storing data used herein and/or local versions of applications or interference detection component 106 and/or one or more of its subcomponents being executed by processor 733. Memory 730 can include any type of computer-readable medium usable by a computer or processor 733, such as random access memory (RAM), read only memory (ROM), tapes, magnetic discs, optical discs, volatile memory, non-volatile memory, and any combination thereof. In an aspect, for example, memory 730 may be a computer-readable storage medium that stores one or more computer-executable codes defining interference detection component 106 and/or one or more of its subcomponents, and/or data associated therewith, when UE 115-*a* is operating processor 733 to execute interference detection component 106 and/or one or more of its subcomponents. In another aspect, for example, memory 730 may be a non-transitory computer-readable storage medium.

Figure 8:
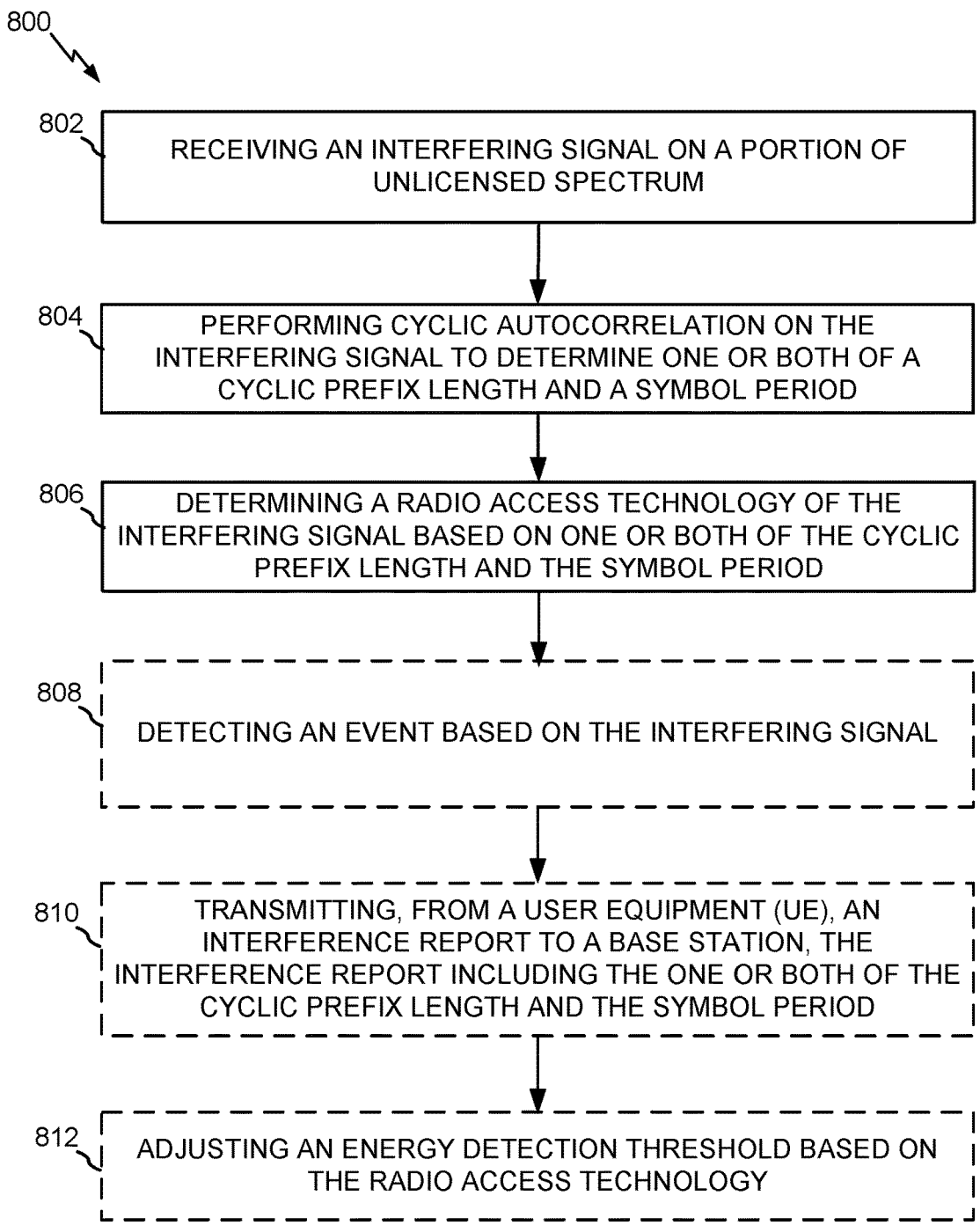
FIG. 8 is a flowchart of an aspect of a method of detecting and reporting interference by a UE in accordance with the present aspects.

Referring to FIG. 8, in an aspect, one non-limiting example of a method 800 detecting an interfering signal in wireless communications, especially, for instance, from another radio access technology operating in unlicensed spectrum. Method 800 may be operated by, for example, UE 115-*a* via execution of interference detection component 106, as described herein. In another aspect, the method 800 may be operated by, for example, the access point 105-*a* via executation of communications component 108. It should be noted that aspects are described with reference to one or more components and one or more methods that may perform the actions or functions described herein. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

At block 802, the method 800 may include receiving an interfering signal on a portion of unlicensed spectrum. In an aspect, for example, the receiving component 702 may receive the interfering signal 150 on a portion of unlicensed spectrum. The interfering signal 150 may be transmitted by a device communicating in a network that is different than the wireless communications system 100. The device may be, for example, an access terminal connected to a different network using the same radio access technology or a different radio access technology or a base station using a the same radio access technology or a different radio access technology. Additional description and details relating to the receiving the interfering signal may be found, for instance, in the above discussion of receiving component 702 with respect to FIG. 7.

At block 804, the method 800 may include performing cyclic autocorrelation on the interfering signal to determine one or both of a cyclic prefix length and a symbol period. In an aspect, for example, the cyclostationarity component 704 may perform cyclic autocorrelation on the interfering signal 150 to determine one or both of a cyclic prefix length and a symbol period. For example, performing cyclic autocorrelation may include delaying the interfering signal 150 and correlating the delayed interfering signal with the original interfering signal. The performing cyclic autocorrelation may also include multiplying the correlated signal by a sinusoidal frequency. In an aspect, the delay may be based on a hypothesis for a cyclic property (e.g., symbol period or cyclic prefix length) of a known radio access technology. Additional description and details relating to the performing cylic autocorrelation may be found, for instance, in the above discussion of cyclostationarity component 704 with respect to FIG. 7.

At block 806, method 800 may include determining a radio access technology of the interfering signal based on one or both of the cyclic prefix length and the symbol period. In an aspect, for example, the technology identifying component 706 may determine a radio access technology of the interfering signal 150 based on one or both of the cyclic prefix length and the symbol period. For example, determining the radio access technology of the interfering signal may include comparing a determined cyclic prefix length and/or symbol period to properties of known radio access technologies to determine a matching radio access technology. Identifying the radio access technology may also include identifying a bandwidth or channels used by the interfering signal. For example, the bandwidth of channels may be based on a number of channels that concurrently receive an interfering signal 150 having similar cyclic prefix length and/or symbol period. Additional description and details relating to determining the radio access technology of the interfering signal may be found, for instance, in the above discussion of the technology identifying component 706 with respect to FIG. 7.

At block 808, method 800 may optionally include detecting an event based on the interfering signal. In an aspect, for example the reporting component 710 may detect an event based on the interfering signal 150. The event may be configured by the access point 105-*a*. In an aspect, detecting an event based on the interfering signal may include detecting the interfering signal from the radio access technology for a threshold amount of time, determining that the radio access technology of the interfering signal has not been recently detected, or determining that a radio access technology of a previously detected interfering signal has not been recently detected. Additional description and details relating to detecting the event based on the interfering signal may be found, for instance, in the above discussion of the reporting component 710 with respect to FIG. 7.

At block 810, the method 800 may optionally include transmitting an interference report to a base station, the interference report including the one or both of the cyclic prefix length and the symbol period. In an aspect, for example, the reporting component 710 may transmit the interference report to the access point 105-*a*. In an aspect, the interference report may further include channels on which the interfering signal 150 was detected or a duration of a packet on the interfering signal. The interference report may also include a received signal strength indicator (RSSI) associated with the interfering signal. The interference report may also include the identified RAT. In an aspect, transmitting the interference report may be in response to detecting the event in block 808. Additional description and details relating to transmitting an interference report to the base station may be found, for instance, in the above discussion of the reporting component 710 with respect to FIG. 7.

At block 812, method 800 may optionally include adjusting an energy detection threshold based on the radio access technology. In an aspect, for example, the coexistence component 708 may adjust the energy detection threshold based on the radio access technology. For example, the coexistence component 708 may set the energy detection threshold to a new value based on the radio access technology of the interfering signal 150. Additional description and details relating to adjusting an energy detection threshold may be found, for instance, in the above discussion of the coexistence component 708 with respect to FIG. 7. In another aspect, the coexistence component 708 may communicate with the communications component 108 at the access point 105-*a* to adjust the energy detection threshold. For example, the coexistence component 708 may receive an energy detection threshold determined by the access point 105-*a* based on an interference report. The coexistence component 708 may also adjust other communication properties based on the radio access technology as described in further detail below with respect to FIGS. 9 and 10.

Figure 9:
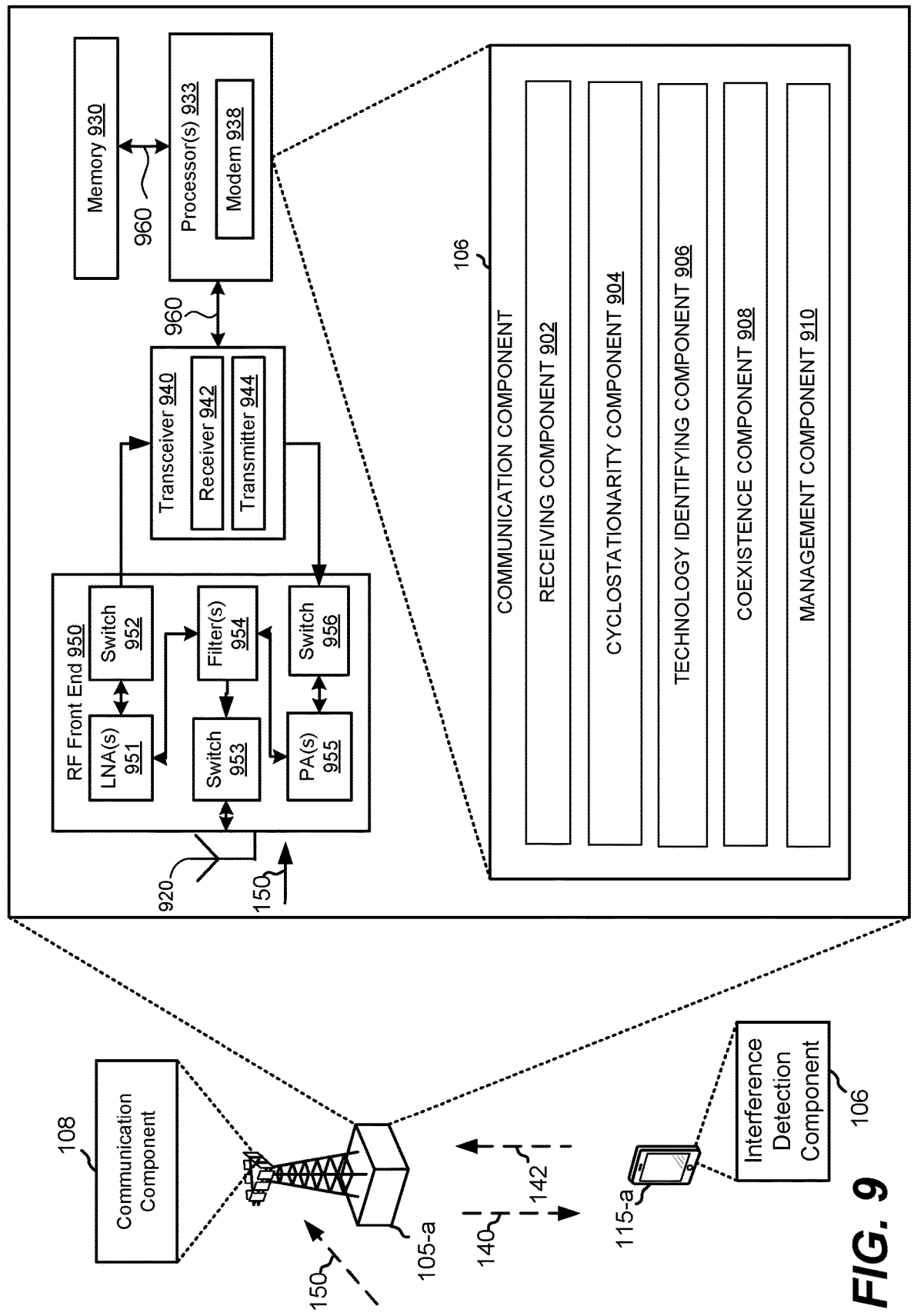
FIG. 9 is a diagram illustrating one or more components of a base station by which interference detection and mitigation may be implemented in accordance with the present aspects.

FIG. 9 is a diagram illustrating one or more components of an access point by which interference detection and mitigation may be implemented in accordance with the present aspects. One or more components of access point 105-a of FIG. 1, by which interference detection and mitigation may be implemented, are illustrated with respect to communications component 108. It should be noted that each of the one or more components of access point 105-a may be implemented as software, hardware, firmware, or any combination thereof. As noted above, access point 105-a generally operates communications component 108 to detect interfering signals 150 and mitigate interference either caused by the interfering signals 150 or caused to a receiver of the interfering signals 150. As discussed above, the access point 105-a and/or the communications component 108 may include one or more sub-components similar to the sub-components of interference detection component 106 and/or perform any of the functions of interference detection component 106.

According to the present aspects, the access point 105-a may include one or more processors 933 that may operate in combination with the communications component 108 configured to detect and mitigate interference associated with one or more interfering signals 150. For example, the communications component 108 may detect interference at the access point 105-a or receive an interference report from a UE 115. The communications component 108 may be communicatively coupled to a transceiver 940, which may include a receiver 942 for receiving and processing RF signals and a transmitter 944 for processing and transmitting RF signals. The communications component 108 may include a receiving component 902 for receiving an interfering signal on a portion of unlicensed spectrum, a cyclostationarity component 904 for performing autocorrelation on the interfering signal to determine one or both of a cyclic prefix length and a symbol period, a technology identifying component 906 for determining a RAT of the interfering signal based on one or both of the cyclic prefix length or the symbol period, a coexistence component 908 for adjusting an energy detection threshold based on the RAT of the interfering signal, and a management component 910 for managing interference reports received from UEs 115. The processor 933 may be coupled to the transceiver 940 and a memory 930 via at least one bus 960.

The receiver 942 may include hardware, firmware, and/or software code executable by a processor for receiving data, the code comprising instructions and being stored in a memory (e.g., computer-readable medium). The receiver 942 may be, for example, a radio frequency (RF) receiver. In an aspect, the receiver 942 may receive signals transmitted by one or more of the UEs 115. The receiver 942 may also receive one or more interfering signals 150 from an access point 105 or UE 115 to which the access point 105-a is not connected. In an aspect, an interfering signal 150 may be received separately when the interference report signal 142 is not being transmitted or received, or the interfering signal 150 may be combined with the interference report signal 142. In another aspect, the receiver 942 may receive an interference report generated by the interference detection component 106.

The transmitter 944 may include hardware, firmware, and/or software code executable by a processor for transmitting data, the code comprising instructions and being stored in a memory (e.g., computer-readable medium). The transmitter 944 may be, for example, a RF transmitter. The transmitter 944 may transmit a configuration message to the interference detection component 106. For example, in an LTE system, the transmitter 744 may transmit the configuration information as data on a physical broadcast channel (PDCH), a physical downlink shared channel (PDSCH) or a physical downlink control channel (PDCCH).

In an aspect, the one or more processors 933 can include a modem 938 that uses one or more modem processors. The various functions related to communications component 108 may be included in modem 938 and/or processors 933 and, in an aspect, can be executed by a single processor, while in other aspects, different ones of the functions may be executed by a combination of two or more different processors. For example, in an aspect, the one or more processors 933 may include any one or any combination of a modem processor, or a baseband processor, or a digital signal processor, or a transmit processor, or a transceiver processor associated with transceiver 940. In particular, the one or more processors 933 may implement components included in the communications component 108.

The receiving component 902 may include hardware, firmware, and/or software code executable by a processor (e.g., processor(s) 933) for receiving an interfering signal 150 on a portion of unlicensed spectrum, the code comprising instructions and being stored in a memory (e.g., memory 930 or another computer-readable medium). For example, the receiving component 902 may include or control an antenna 920, RF front end 950, and/or receiver 942 to receive the interfering signal 150. In an aspect, the receiving component 902 may receive the interfering signal 150 at various times. In another aspect, the receiving component 902 may use an antenna 920 or receive chain that is not being used for communication with the UEs 115 to receive the interfering signal 150. For example, the access point 105-a may include a network listening module dedicated to receiving interfering signals. In another aspect, the receiving component 702 may receive a combined signal including the downlink signal 140 and the interfering signal 150. The receiving component 902 may use filtering, interference cancellation, or other techniques to process the combined signal.

The cyclostationarity component 904 may include hardware, firmware, and/or software code executable by a processor (e.g., processor(s) 933) for performing autocorrelation on the interfering signal to determine one or both of the cyclic prefix length and the symbol period of the interfering signal 150, the code comprising instructions and being stored in a memory (e.g., memory 930 or another computer-readable medium). The cyclostationarity component 904 may determine second order cyclostationarity properties of the interfering signal 150. For example, the cyclostationarity component 904 may perform cyclic autocorrelation on the interfering signal 150 to determine patterns of the interfering signal 150. For example, the cyclostationarity component 904 may delay the interfering signal 150 and correlate the delayed interfering signal with the original interfering signal. The cyclostationarity component 904 may also multiply the correlated signal by a sinusoidal frequency. The autocorrelation may exhibit higher correlation for delays of the symbol period and/or the cyclic prefix length of the interfering signal. In an aspect, the cyclostationarity component 904 may test various hypotheses based on the symbol period and/or cyclic prefix length of known radio access technologies (e.g., Wi-Fi, another LTE system, or eCC). In an aspect, the cyclostationarity component 904 may further estimate a transmission opportunity (TXOP) duration (e.g. the length of a packet, frame, or sub-frame) of the interfering signal 150 using sequential detection. For example, the cyclostationarity component 904 may determine a duration of a TXOP of an interfering signal exhibiting a symbol period and/or cyclic prefix length by determining an approximate start and end of the interfering signal 150. In an aspect, the cyclostationarity component 904 may determine the cyclic prefix length and/or symbol period based on any portion of a data packet including multiple OFDM symbols or cylic prefixes. For example, the cyclostationarity component 904 may detect the cyclic prefix length and/or symbol period without receiving a preamble of a data packet. Moreover, in an aspect, the cyclostationarity component 904 may perform the cyclic autocorrelation without decoding the interfering signal 150. Accordingly, the interfering signal 150 may be identified without using a co-located receiver specific to the technology of the interfering signal 150. Additionally, the cyclostationarity component 904 may operate on an interfering signal 150 having a low signal-to-noise ratio (SNR) that may prevent decoding of the interfering signal.

The technology identifying component 906 may include hardware, firmware, and/or software code executable by a processor (e.g., processor(s) 933) for determining a RAT of the interfering signal based on one or both of the cyclic prefix length and the symbol period, the code comprising instructions and being stored in a memory (e.g., memory 930 or another computer-readable medium). For example, the technology identifying component 906 may compare the cyclic prefix length and/or symbol period to properties of known RATs (e.g., based on OFDM numerology for each RAT). The technology identifying component 906 may also identify a bandwidth or channels used by the interfering signal. For example, the technology identifying component 906 may determine a number of channels that concurrently receive an interfering signal 150 having similar cyclic prefix length and/or symbol period.

The coexistence component 908 may include hardware, firmware, and/or software code executable by a processor (e.g., processor(s) 933) for adjusting a communication property based on the RAT of the interfering signal, the code comprising instructions and being stored in a memory (e.g., memory 930 or another computer-readable medium). For example, the coexistence component 908 may adjust an energy detection threshold. In an aspect, the energy detection threshold may be a minimum energy level that may cause a wireless device to take an action to improve coexistence between the RAT of the wireless device and another RAT. For example, the wireless device may change channels to prevent interference to another RAT. In an aspect, the coexistence component 908 may adjust the energy detection threshold for different RATs. For example, the coexistence component 908 may reduce the energy detection threshold when the RAT of the interfering signal is Wi-Fi. The coexistence component 908 may further take an action to improve coexistence with the RAT of the interfering signal when the received energy exceeds the adjusted energy detection threshold. For example, the coexistence component 908 may change channels or reduce a transmission power. As another example of adjusting a communication property, the coexistence component 908 may adjust a contention window size for channel access at either the UE 115-a or access point 105-a based on the outcome of detection of a radio access technology. For example, the contention window size may be based on the determined radio access technology. In an aspect, the contention window size on a first channel may be dependent on a radio access technology of an interfering signal detected on a different second channel. As another example, the coexistence component 908 may adjust a TXOP of the UE 115-a or access point 105-a based on a TXOP of the interfering signal. As another example, the coexistence component 908 may switch from a first window adaptation technique to a different second window adaptation technique based on an RSSI of the interfering signal and/or a duration of the TXOP of the interfering signal. In an aspect, the coexistence component 908 may communicate with the interference detection component 106 at a UE 115-a to perform any of the above functions. For example, the communications component 108 may implement the changes at the access point 105-a or transmit signaling to implement the changes at the UE 115-a.

The management component 910 may include hardware, firmware, and/or software code executable by a processor (e.g., processor(s) 933) for managing interference reports including one or both of the cyclic prefix length and the symbol period, the code comprising instructions and being stored in a memory (e.g., memory 930 or another computer-readable medium). In an aspect, the interference report may also or alternatively include an identified RAT of the interfering signal 150, a bandwidth of the interfering signal 150, channels on which the interfering signal 150 was concurrently detected, a TXOP of the interfering signal 150, a duration of a packet, or a frame structure. In an aspect, the management component 910 may manage interference reports for multiple UEs 115.

In an aspect, the management component 910 may configure each UE 115 to transmit one or more interference reports. For example, the management component 910 may request an interference report for an indicated set of channels and provide a measurement gap to detect the interfering signal 150. As another example, the management component 910 may configure the reporting component 710 to periodically transmit an interference report. In another aspect, the management component 910 may configure the reporting component 710 at a UE 115-a to transmit an interference report based on various events detected at the UE 115-a. For example, an example event may be detection of an interfering signal 150 from an identified RAT persistently (e.g., more than a threshold amount of time during a time period). Another example event may be determining that an interfering signal is from a RAT that has not been recently reported or is not stored in a list of neighboring RATs. Another example event may be determining that an interfering signal from a previously identified RAT has not been detected recently or for a defined time period. In an aspect, the management component 910 may also request an energy measurement (e.g., received signal strength indicator (RSSI)) for an interfering signal in an interference report. The energy measurement may be associated with the identified RAT. Accordingly, the management component 910 receiving one or more interference reports may be able to determine the presence or general location of another RAT network even if the interfering signal 150 is not received at the access point 105. In an aspect, the management component 910 may also request the TXOP of the interfering signal 150 in an interference report.

RF front end 950 may be connected to one or more antennas 970 and an include one or more low-noise amplifiers (LNAs) 951, one or more switches 952, 953, one or more power amplifiers (PAs) 955, and one or more filters 954 for transmitting and receiving RF signals. In an aspect, components of RF front end 950 can connect with transceiver 940. Transceiver 940 may connect to one or more modems 938 and processor 933.

In an aspect, LNA 951 can amplify a received signal at a desired output level. In an aspect, each LNA 951 may have a specified minimum and maximum gain values. In an aspect, RF front end 950 may use one or more switches 952, 953 to select a particular LNA 951 and its specified gain value based on a desired gain value for a particular application.

Further, for example, one or more PA(s) 955 may be used by RF front end 950 to amplify a signal for an RF output at a desired output power level. In an aspect, each PA 955 may have a specified minimum and maximum gain values. In an aspect, RF front end 950 may use one or more switches 953, 956 to select a particular PA 955 and its specified gain value based on a desired gain value for a particular application.

Also, for example, one or more filters 954 can be used by RF front end 950 to filter a received signal to obtain an input RF signal. Similarly, in an aspect, for example, a respective filter 954 can be used to filter an output from a respective PA 955 to produce an output signal for transmission. In an aspect, each filter 954 can be connected to a specific LNA 951 and/or PA 955. In an aspect, RF front end 950 can use one or more switches 952, 953, 956 to select a transmit or receive path using a specified filter 954, LNA, 951, and/or PA 955, based on a configuration as specified by transceiver 940 and/or processor 933.

Transceiver 940 may be configured to transmit and receive wireless signals through antenna 970 via RF front end 950. In an aspect, transceiver may be tuned to operate at specified frequencies such that access point 105-*a* can communicate with, for example, UEs 115. In an aspect, for example, modem 938 can configure transceiver 940 to operate at a specified frequency and power level based on the configuration of the access point 105-*a* and/or UE 115-*a* and communication protocol used by modem 938.

In an aspect, modem 938 can be a multiband-multimode modem, which can process digital data and communicate with transceiver 940 such that the digital data is sent and received using transceiver 940. In an aspect, modem 938 can be multiband and be configured to support multiple frequency bands for a specific communications protocol. In an aspect, modem 938 can be multimode and be configured to support multiple operating networks and communications protocols. In an aspect, modem 938 can control one or more components of access point 105-*a* (e.g., RF front end 950, transceiver 940) to enable transmission and/or reception of signals from the network based on a specified modem configuration. In an aspect, the modem configuration can be based on the mode of the modem and the frequency band in use.

Access point 105-*a* may further include a memory 930, such as for storing data used herein and/or local versions of applications or communications component 108 and/or one or more of its subcomponents being executed by processor 933. Memory 930 can include any type of computer-readable medium usable by a computer or processor 933, such as random access memory (RAM), read only memory (ROM), tapes, magnetic discs, optical discs, volatile memory, non-volatile memory, and any combination thereof. In an aspect, for example, memory 930 may be a computer-readable storage medium that stores one or more computer-executable codes defining interference detection component 106 and/or one or more of its subcomponents, and/or data associated therewith, when UE 115-*a* is operating processor 933 to execute communications component 108 and/or one or more of its subcomponents. In another aspect, for example, memory 930 may be a non-transitory computer-readable storage medium.

Figure 10:
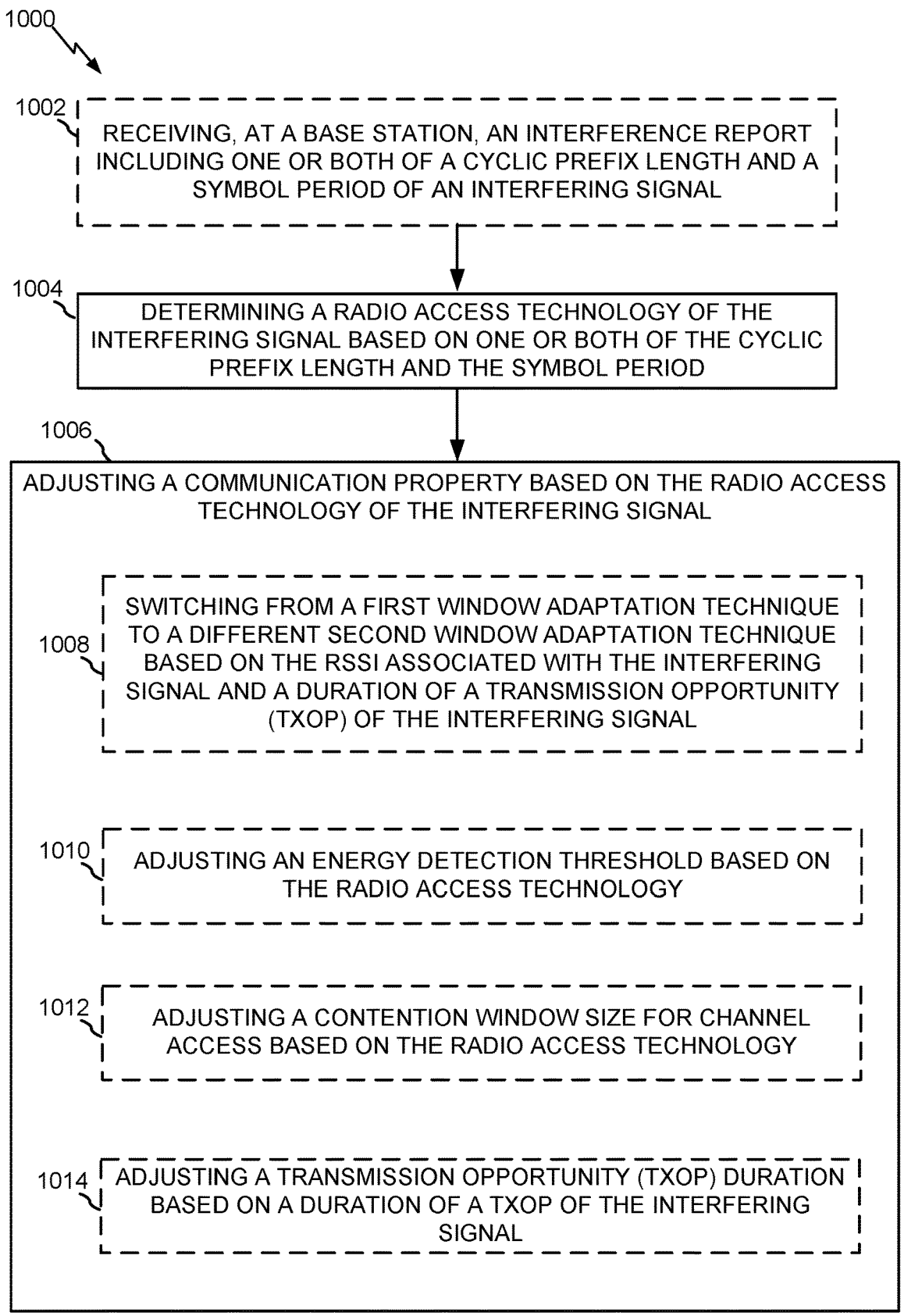
FIG. 10 is a flowchart of an aspect of a method of adjusting communication properties based on detected interference in accordance with the present aspects.

FIG. 10 is a flowchart of an aspect of a method 1000 of adjusting communication properties based on detected interference in accordance with the present aspects. Method 1000 may be operated by, for example, access point 105-*a* via execution of communications component 108, as described herein. It should be noted that aspects are described with reference to one or more components and one or more methods that may perform the actions or functions described herein. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

In block 1002, the method 1000 may include receiving, at a base station, an interference report including one or both of a cyclic prefix length and a symbol period of an interfering signal. In an aspect, for example, the receiving component 902, at the access point 105-*a*, may receive an interference report from a UE 115-*a* including one or both of a cyclic prefix length and a symbol period. For example, the receiving component 902 may receive the interference report transmitted in block 810 of method 800. In another aspect, the receiving component 902 may receive the interfering signal 150 and the cyclostationarity component 904 may determine the cyclic prefix length and the symbol period from the received signal. Additional description and details relating to receiving an interference report may be found, for instance, in the above discussion of the management component 910 with respect to FIG. 9.

In block 1004, the method 1000 may include determining a radio access technology of the interfering signal based on one or both of the cyclic prefix length and the symbol period. In an aspect, for example, the technology identifying component 906 may determine a radio access technology of the interfering signal 150 based on one or both of the cyclic prefix length and the symbol period. Additional description and details relating to determining a radio access technology of the interfering signal may be found, for instance, in the above discussion of the technology identifying component 906 with respect to FIG. 9.

In block 1006, the method 1000 may include adjusting a communication property based on the radio access technology of the interfering signal. In an aspect, for example, the coexistence component 908 may adjust a communication property at the access point 105-*a* based on the radio access technology of the interfering signal. Alternative or additionally, the management component 910 may adjust a communication property at a UE 115-*a* based on the radio access technology of the interfering signal. For example, the communication property may be a window adaptation technique, an energy detection threshold, a contention window size, or a transmission opportunity duration. Additional description and details relating to adjusting the communication property may be found, for instance, in the above discussion of the coexistence component 908 and the management component 910 with respect to FIG. 9.

In block 1008, the method 1000 may include switching from a first window adaptation technique to a different second window adaptation technique based on an RSSI associated with the interfering signal and a duration of a TXOP of the interfering signal. In an aspect, for example, the coexistence component 908 may switch from a first window adaptation technique to a different second window adaptation technique based on an RSSI associated with the interfering signal and a duration of a TXOP of the interfering signal. Additional description and details relating to switching from a first window adaptation technique to a different second window adaptation technique may be found, for instance, in the above discussion of the coexistence component 908 and the management component 910 with respect to FIG. 9.

In block 1010, the method 1000 may include adjusting an energy detection threshold based on the radio access technology. In an aspect, for example, the coexistence component 908 may adjust an energy detection threshold based on the radio access technology. For example, the coexistence component 908 may associate a lower energy detection threshold with a specific radio access technology such as Wi-Fi. When the interfering signal 150 is determined to be associated with the specific radio access technology, the coexistence component 908 may adjust the energy detection threshold to the associated lower energy detection threshold. The lower energy detection threshold may then be used to control transmission properties when necessary. Additional description and details relating to adjusting the energy detection threshold may be found, for instance, in the above discussion of the coexistence component 908 and the management component 910 with respect to FIG. 9.

In block 1012, the method 1000 may include adjusting a contention window size for channel access based on the radio access technology. In an aspect, for example, the coexistence component 908 may adjust the contention window size for channel access based on the radio access technology. For example, the coexistence component 908 may adjust the contention window size to match a contention window size of the radio access technology. Additional description and details relating to adjusting a contention window size may be found, for instance, in the above discussion of the coexistence component 908 and the management component 910 with respect to FIG. 9.

In block 1014, the method 1000 may include adjusting a TXOP duration based on a duration of a TXOP of the interfering signal. In an aspect, for example, the coexistence component 908 may adjust the duration of the TXOP based on the duration of the TXOP of the interfering signal. For example, the coexistence component 908 may adjust the duration of the TXOP to match the duration of the TXOP of the radio access technology of the TXOP. Accordingly, the radio network associated with the interfering signal may treat interference caused by the access point 105-*a* or the UE 115-*a* as another transmission using the same radio access technology and may use interference mitigation algorithms to reduce the effects of the interference. In another example, the coexistence component 908 may shorten the TXOP for a UE 115-*a* to fit within a transmission gap in the identified radio access technology. Additional description and details relating to adjusting a TXOP duration may be found, for instance, in the above discussion of the coexistence component 908 and the management component 910 with respect to FIG. 9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a UE, which can be a wired terminal or a wireless terminal. A UE can also be called a system, device, subscriber unit, subscriber station, mobile station, mobile, mobile device, remote station, remote terminal, access terminal, user terminal, terminal, communication device, user agent, or user device. A UE may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with UE or wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as LTE, CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of detecting interference in wireless communications, comprising:
   receiving, by a receiver of a user equipment (UE) that is connected to a base station, an interfering signal on a portion of unlicensed spectrum from a wireless device to which the UE is not connected;
   performing, by a processor of the UE, cyclic autocorrelation on the interfering signal to determine a cyclic prefix length and a symbol period;
   determining, by the processor of the UE, a radio access technology (RAT) of the interfering signal by comparing the cyclic prefix length and the symbol period of the interfering signal with corresponding properties of known RATs;
   adjusting an energy detection threshold by the UE based on the RAT of the interfering signal to mitigate interference to the wireless device;
   detecting an event based on the RAT of the interfering signal as determined by the UE, the event indicating at least one of the RAT causing interference for more than a threshold amount of time, the RAT causing interference after not being reported for a defined period of time, the RAT not being stored in a list of neighboring RATs, or the RAT being a previously identified RAT that has not been detected for the defined period of time; and
   transmitting, from the UE to the base station, an interference report in response to the event.

2. The method of claim 1, wherein the interference report includes a received signal strength indicator (RSSI) associated with the interfering signal.

3. The method of claim 2, further comprising switching from a first window adaptation technique to a different second window adaptation technique based on the RSSI associated with the interfering signal and a duration of a transmission opportunity (TXOP) of the interfering signal.

4. The method of claim 1, further comprising adjusting a contention window size for channel access based on the RAT of the interfering signal.

5. The method of claim 4, wherein the contention window size for channel access on a first channel is dependent on detection of the RAT of the interfering signal on a different channel.

6. The method of claim 1, further comprising adjusting a transmission opportunity (TXOP) duration based on a duration of a TXOP of the interfering signal.

7. The method of claim 6, wherein the duration of the TXOP of the interfering signal is detected at the base station or reported by one or more UEs.

8. The method of claim 1, wherein the cyclic autocorrelation is performed without receiving a preamble of a data packet and without decoding the interfering signal.

9. The method of claim 1, wherein the interference report includes the cyclic prefix length and the symbol period.

10. The method of claim 1, wherein the interference report includes channels on which the interfering signal was detected or a duration of a packet on the interfering signal.

11. The method of claim 1, wherein the energy detection threshold is a minimum energy level that causes the UE to change at least one of a transmission channel, a transmission power, a contention window size, a transmission opportunity (TXOP) duration, or a window adaptation technique of the UE, wherein the adjusting comprises reducing the energy detection threshold in response to the RAT of the interfering signal being detected as Wi-Fi.

12. The method of claim 1, wherein the base station and the wireless device communicate in different networks.

13. The method of claim 1, wherein the interference report indicates a transmission direction of the interfering signal.

14. The method of claim 1, wherein the interference report indicates multiple cyclic prefix and symbol period combinations for a channel over a period of time.

15. A user equipment (UE) for detecting interference in wireless communications, comprising:
  a transceiver configured to receive an interfering signal on a portion of unlicensed spectrum from a wireless device to which the UE is not connected;
  a memory; and
  a processor communicatively coupled with the transceiver and the memory, the processor and the memory configured to:
    perform cyclic autocorrelation on the interfering signal to determine a cyclic prefix length and a symbol period;
    determine a radio access technology (RAT) of the interfering signal based on the cyclic prefix length and the symbol period of the interfering signal with corresponding properties of known RATs;
    adjust an energy detection threshold based on the RAT of the interfering signal to mitigate interference to the wireless device;
    detect an event based on the RAT of the interfering signal as determined by the UE, the event indicating at least one of the RAT causing interference for more than a threshold amount of time, the RAT causing interference after not being reported for a defined period of time, the RAT not being stored in a list of neighboring RATs, or the RAT being a previously identified RAT that has not been detected for the defined period of time; and
    transmit, from the UE to a base station, an interference report in response to the event.

16. The UE of claim 15, wherein the interference report further includes a received signal strength indicator (RSSI) associated with the interfering signal.

17. The UE of claim 16, wherein the processor and the memory are configured to switch from a first window adaptation technique to a different second window adaptation technique based on the RSSI associated with the interfering signal and a duration of a TXOP transmission opportunity (TXOP) of the interfering signal.

18. The UE of claim 15, wherein the processor and the memory are configured to adjust a contention window size for channel access based on the RAT of the interfering signal.

19. The UE of claim 18, wherein the contention window size for channel access on a first channel is dependent on detection of the RAT of the interfering signal on a different channel.

20. The UE of claim 15, wherein the processor and the memory are configured to adjust a transmission opportunity (TXOP) duration based on a duration of a TXOP of the interfering signal.

21. The UE of claim 20, wherein the processor and the memory are configured to detect the duration of the TXOP of the interfering signal.

22. The UE of claim 15, wherein the cyclic autocorrelation is performed without receiving a preamble of a data packet and without decoding the interfering signal.

23. The UE of claim 15, wherein the interference report includes the cyclic prefix length and the symbol period.

24. The UE of claim 15, wherein the interference report includes channels on which the interfering signal was detected or a duration of a packet on the interfering signal.

25. The UE of claim 15, wherein the energy detection threshold is a minimum energy level that causes the UE to change at least one of a transmission channel, a transmission power, a contention window size, a transmission opportunity (TXOP) duration, or a window adaptation technique of the UE, wherein the processor and the memory are configured to reduce the energy detection threshold in response to the RAT of the interfering signal being detected as Wi-Fi.

26. The UE of claim 15, wherein the base station and the wireless device communicate in different networks.

27. A user equipment (UE) for detecting interference in wireless communications, comprising:
  means for receiving an interfering signal on a portion of unlicensed spectrum from a wireless device to which the UE is not connected;
  means for performing cyclic autocorrelation on the interfering signal to determine a cyclic prefix length and a symbol period;
  means for determining a radio access technology (RAT) of the interfering signal by comparing the cyclic prefix length and the symbol period of the interfering signal with corresponding properties of known RATs;
  means for adjusting an energy detection threshold based on the RAT of the interfering signal to mitigate interference to the wireless device;
  means for detecting an event based on the RAT of the interfering signal as determined by the UE, the event indicating at least one of the RAT causing interference for more than a threshold amount of time, the RAT causing interference after not being reported for a defined period of time, the RAT not being stored in a list of neighboring RATs, or the RAT being a previously identified RAT that has not been detected for the defined period of time; and means for transmitting, from the UE to a base station, an interference report in response to the event.

28. The UE of claim 27, wherein the cyclic autocorrelation is performed without receiving a preamble of a data packet and without decoding the interfering signal.

29. The UE of claim 27, wherein the interference report includes the cyclic prefix length and the symbol period.

30. A non-transitory computer-readable medium storing computer executable code for detecting interference in wireless communications, comprising code to:
   receive, by a receiver of a user equipment (UE) that is connected to a base station, an interfering signal on a portion of unlicensed spectrum from a wireless device to which the UE is not connected;
   perform, by a processor of the UE, cyclic autocorrelation on the interfering signal to determine a cyclic prefix length and a symbol period;
   determine, by the processor of the UE, a radio access technology (RAT) of the interfering signal by comparing the cyclic prefix length and the symbol period of the interfering signal with corresponding properties of known RATs;
   adjust, by the processor of the UE, an energy detection threshold based on the RAT of the interfering signal to mitigate interference to the wireless device;
   detect an event based on the RAT of the interfering signal as determined by the UE, the event indicating at least one of the RAT causing interference for more than a threshold amount of time, the RAT causing interference after not being reported for a defined period of time, the RAT not being stored in a list of neighboring RATs, or the RAT being a previously identified RAT that has not been detected for the defined period of time; and
   transmit, from the UE to the base station, an interference report in response to the event.

* * * * *